(12) United States Patent
Chrysanthakopoulos et al.

(10) Patent No.: US 11,991,942 B2
(45) Date of Patent: May 28, 2024

(54) IMPLEMENT ATTACHMENT SYSTEM FOR AUTONOMOUS MODULAR GROUND UTILITY ROBOT SYSTEM

(71) Applicant: DCENTRALIZED SYSTEMS LLC, Seattle, WA (US)

(72) Inventors: Georgios Chrysanthakopoulos, Seattle, WA (US); Adlai Felser, Seattle, WA (US)

(73) Assignee: Dcentralized Systems, Inc., Seattle, WA (US)

( * ) Notice: Subject to any disclaimer, the term of this patent is extended or adjusted under 35 U.S.C. 154(b) by 1006 days.

(21) Appl. No.: 16/405,282

(22) Filed: May 7, 2019

(65) Prior Publication Data

US 2020/0000002 A1    Jan. 2, 2020

Related U.S. Application Data

(63) Continuation-in-part of application No. PCT/US2018/067458, filed on Dec. 24, 2018, and a continuation-in-part of application No. 29/665,575, filed on Oct. 4, 2018, now Pat. No. Des. 918,977, and a continuation-in-part of application No. 16/024,450, filed on Jun. 29, 2018, now Pat. No. 10,863,668.

(60) Provisional application No. 62/820,375, filed on Mar. 19, 2019.

(51) Int. Cl.
*A01B 59/06* (2006.01)
*A01B 69/00* (2006.01)
*A01B 69/04* (2006.01)
*E02F 9/20* (2006.01)

(52) U.S. Cl.
CPC .......... *A01B 59/066* (2013.01); *A01B 69/008* (2013.01); *E02F 9/205* (2013.01)

(58) Field of Classification Search
CPC .... B60D 1/36; A01D 34/008; A01B 59/0665; A01B 69/008; E02F 9/205
See application file for complete search history.

(56) References Cited

U.S. PATENT DOCUMENTS

| | | | | |
|---|---|---|---|---|
| 4,019,753 A | * | 4/1977 | Kestel | A01B 59/062 |
| | | | | 280/416.2 |
| 6,321,851 B1 | * | 11/2001 | Weiss | A01B 59/062 |
| | | | | 280/477 |
| 6,581,695 B2 | * | 6/2003 | Bernhardt | A01B 59/068 |
| | | | | 37/234 |
| 9,030,040 B2 | * | 5/2015 | Tarasinski | A01B 59/06 |
| | | | | 307/9.1 |
| 9,880,560 B2 | * | 1/2018 | Han | G05D 1/0234 |
| 10,080,321 B2 | * | 9/2018 | Blackwell | A01B 79/00 |
| 10,455,753 B2 | * | 10/2019 | Mollick | A01B 63/02 |
| 10,858,809 B2 | * | 12/2020 | Mollick | E02F 3/7622 |

(Continued)

*Primary Examiner* — Adam J Behrens
(74) *Attorney, Agent, or Firm* — Apex Juris, pllc; Tracy M. Heims

(57) ABSTRACT

An automatic implement attachment and detachment system having a ground utility robot with at least one sensor; a computer processor; and a computer memory whereby the system also includes a quick hitch attachment apparatus having a body securable to the ground utility robot; at least one mateable connection part; and an implement having at least one connection member where the implement attachment system is configured to automatically attach and detach the implement to and from the ground utility robot.

13 Claims, 8 Drawing Sheets

(56) References Cited

U.S. PATENT DOCUMENTS

| | | | |
|---|---|---|---|
| 11,041,284 B2* | 6/2021 | Fey | E02F 3/3627 |
| 2002/0125018 A1* | 9/2002 | Bernhardt | B60D 1/36 |
| | | | 172/439 |
| 2009/0200051 A1* | 8/2009 | Tarasinski | A01B 59/068 |
| | | | 172/439 |
| 2011/0204712 A1* | 8/2011 | Tarasinski | A01B 59/06 |
| | | | 307/9.1 |
| 2015/0045992 A1* | 2/2015 | Ashby | G05D 1/0287 |
| | | | 701/2 |
| 2015/0077557 A1* | 3/2015 | Han | A01B 71/063 |
| | | | 348/148 |
| 2015/0105965 A1* | 4/2015 | Blackwell | A01B 69/008 |
| | | | 701/28 |
| 2017/0245416 A1* | 8/2017 | Hyder | A01B 59/043 |
| 2017/0290258 A1* | 10/2017 | Mollick | A01B 63/023 |
| 2019/0338809 A1* | 11/2019 | Clark | G05D 1/0223 |
| 2019/0361455 A1* | 11/2019 | Fernandez Guzmann | |
| | | | G05D 1/0221 |
| 2020/0329624 A1* | 10/2020 | Thorsell | A01B 59/062 |
| 2020/0341461 A1* | 10/2020 | Yokoyama | G05D 1/0016 |

* cited by examiner

IMPLEMENT ATTACHMENT SYSTEM FOR AUTONOMOUS MODULAR GROUND UTILITY ROBOT SYSTEM

RELATED APPLICATIONS

The above described apparatus uses the active safety system to provide a safe environment for users and others around the system. It can do this in a number of ways. Specifically, it provides a method of hazard avoidance by the ground utility robot and the implement having the steps of providing a ground utility robot, a computer, at least one implement, at least one solar panel, at least one battery, at least one power take-off, and an operating and controlling program that includes a learning program and an artificial intelligence processing unit installed on said computer, connecting the at least one power take-off to the ground utility robot, connecting the at least one implement to the at least one power take-off, charging the at least one battery by the at least one solar panel, powering the ground utility robot, the at least one power take-off and the at least one implement with the at least one battery, and having safety system being comprised of the computer, a safety program at least one sensor, a sensor interface coupling the artificial intelligence processing unit with the sensor, the operating and controlling program controlling the ground utility robot and the at least one power take-off using the operating and controlling program. In this embodiment the ground utility robot starts operation by commencing a preassigned task. This task can is assigned by an operator and can be a new task or a preassigned task. The ground utility robot uses the at least one sensor for sensing, obtaining data and communicating that data to the computer through the sensor interface where the artificial intelligence processing unit installed in the computer begins processing the data on the safety program, then analyzing the data for the presence of an obstacle or no obstacle, then the system through the artificial intelligence processing unit begins recognizing the obstacle, objects and the environment via the data collected by the at least one sensor. The artificial intelligence processing unit and learning program is configured to be trained based on the data it continually receives from the sensors, so that it continually learns to recognize different objects and the environment. After learning and recognizing the objects then the system begins initiating at least one task, or evasive measure in response to the environment or object data inputted to the system. The evasive measure is a predictive measure determined by the artificial intelligence processing unit based on historical information and the one or more of the environmental data input or object data input. The artificial intelligence processing unit is configured to prioritize a series of evasive measures, so that if the obstacle is within a predefined distance of the ground utility robot or the at least one implement then the prioritized evasive measures can be one or more of the following: changing the ground utility robot's directional path; cutting power to the ground utility robot; and cutting power to the at least one power take-off. This system is designed to prevent accidents through the systematic recognition of an obstacle in the predefined distance. In addition to the initial avoidance by the ground utility robot, the ground utility robot will next use the at least one sensor for ongoing monitoring of the obstacle within the predefined distance of the ground utility robot and the at least one implement where the system will begin to modify and change commands, such as reversing the at least one evasive measure when the obstacle is clear from the predefined distance and restarting the preassigned task. In this way, the safety system does not only prevent accidents from happening but it also continues to monitor the area, collect more data, and modify the data based on the historical data so that when the area is clear the system can modify the original command, resume its preassigned task and continue working towards completion of the original, preassigned task.

FIELD OF THE INVENTION

The system also continues to learn as it works. The artificial intelligence processing unit receives an initial command via at least one of the environmental data input or object data input, it then modifies the initial command based on historical information, and finally it directs the ground utility robot to perform the modified command. In one embodiment the system starts assigning at least one value to the obstacle where the at least one value is human, animal or thing, then storing this value as a learned value; and finally assigning a prioritized, specific command based on the learned value. This learned command can be an evasive measure, it can be to shut down power to the PTO, or it could even be to shut down power to the entire ground utility robot. In other words, the artificial intelligence processing unit is configured to direct the ground utility robot to perform tasks responsive to the data sent to the sensor interface. Over time the system eventually differentiates between animal, human, and other object. This system may also include an active monitoring system for the power take-off, where the system has at least one power take-off sensor constantly sensing and monitoring a current draw on the at least one power take-off, then setting a high-end current draw limit on the at least one power take-off and if the high-end limit is reached or exceeded then prioritizing the action of shutting down power to the at least one power take-off. This system is designed to prevent an animal or object from being pulled entirely into the power take-off. In operation, the GURU might be assigned the task of cutting grass. The system knows how much current draw is typical while cutting grass and a high limit is set for this amount of current. If the GURU encounters a tree branch or a human arm, for example, and the branch or arm creates greater resistance to the cutting blade, then the program recognizes that the current draw is higher than normal, that the high limit is breached and thus the system initiates the specific evasive measure or measures, such as cutting power to the GURU, to the PTO or both.

BACKGROUND INFORMATION

The system as described provides enhanced security and safety measures. It is designed to protect the apparatus from damage if it encounters large branches, rocks or other large objects. More importantly, it is designed to protect animals and humans from harm if encountered by the ground utility robot. In addition, the system continues to learn as it encounters obstacles, storing information and differentiating living from non-living, human from non-human, animal from human, just to name a few.

SUMMARY OF THE INVENTION

AI LEARNING. The GURU ideally will be connected online and will have learning ability so that it can continually learn, using connection with online software, supplied by a centralized control center or System Manager (such a cloud computing cluster of computing nodes), and also improve overall performance through machine learning and crowdsourcing, between all deployed robots, of all weed suppression images and actions, pest data, predator data and weather data. The GURU uploads images of all plants, animals, predators, weather conditions, soil conditions, soil tests, and environments it experiences, along with its actions. A machine learning platform processes continuously the inputs (sensor data) and outputs (robot actions) and using reinforcement learning it adapts and modifies the parameters used by all GURU, used to identify plants, pests, move, control the robot's actions, etc. This is essentially a feedback control system that uses data from all the active robots and closes the loop by adjusting configuration parameters, and code, on all the robots. Additionally, the robots self-update when new parameters or code is available.

FIGURES

DETAILED DESCRIPTION OF THE INVENTION

Figure 1:
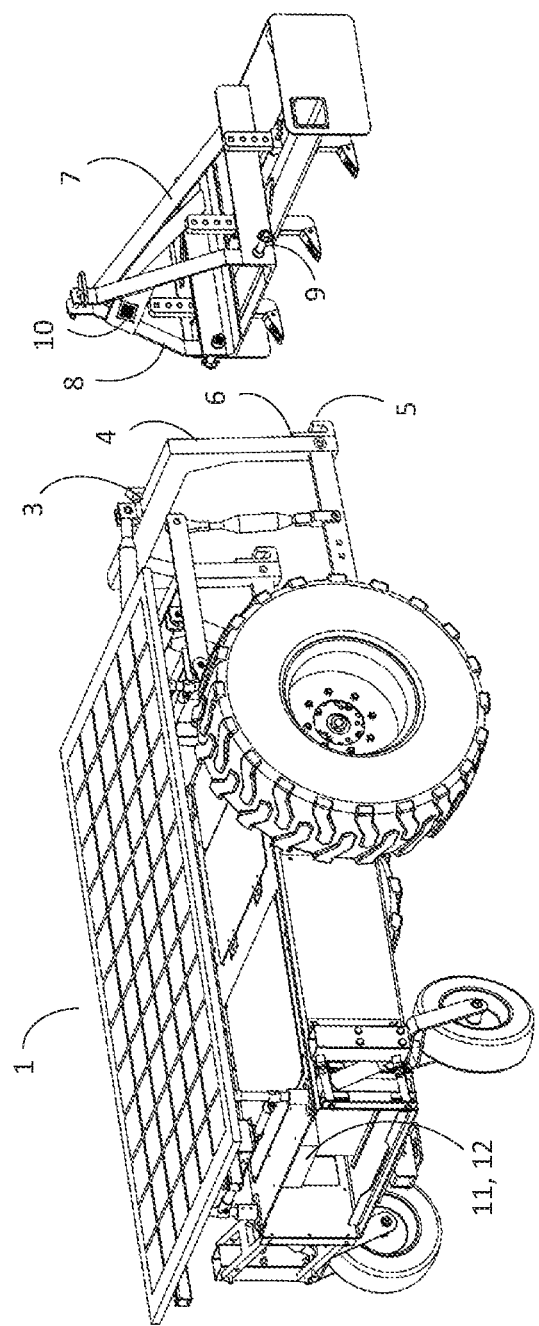
FIG. 1 is a perspective view of the ground utility robot and an implement prior to engagement.
Figure 2:
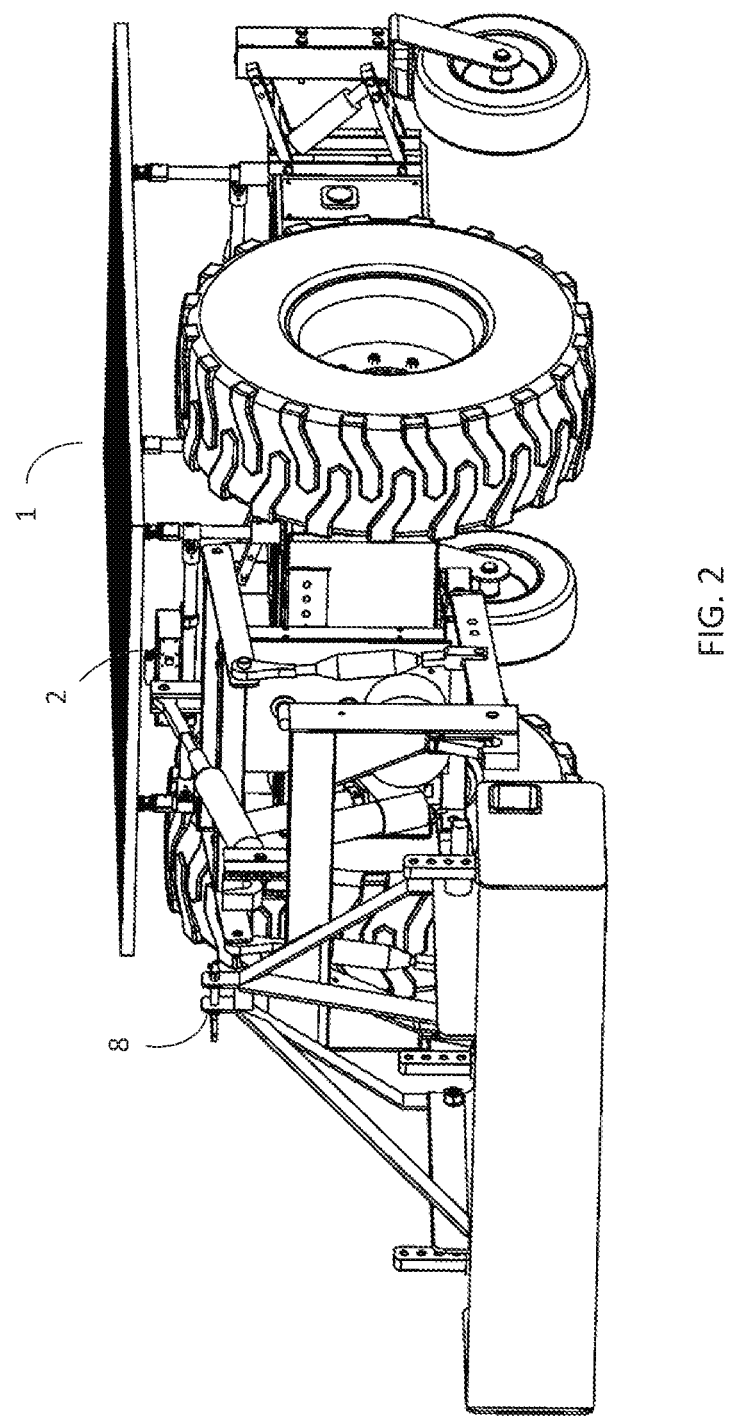
FIG. 2 is another perspective view of the ground utility robot and an implement prior to engagement.
Figure 3:
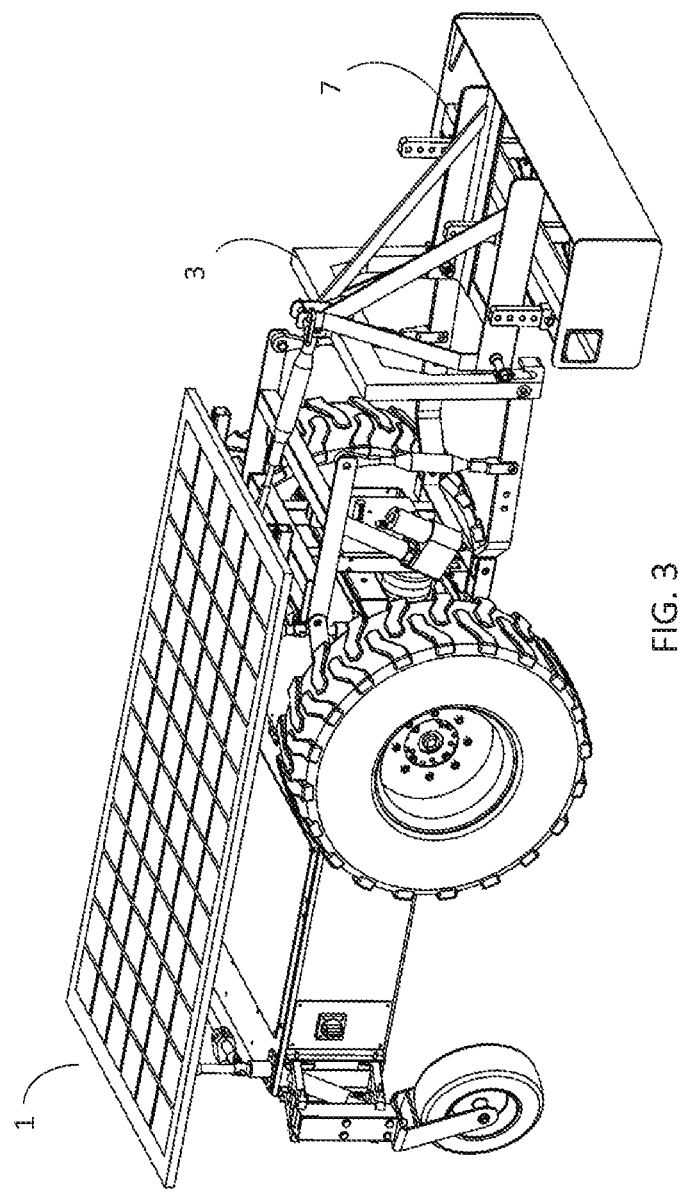
FIG. 3 is another perspective view of the ground utility robot and an implement while the robot is picking up the implement.
Figure 4:
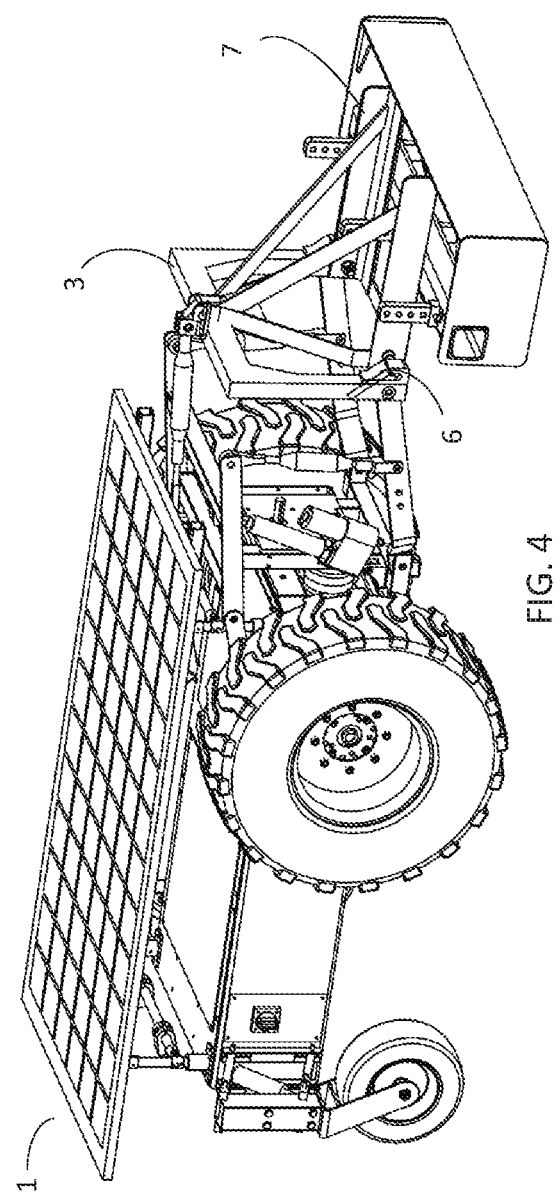
FIG. 4 is another perspective view of the ground utility robot and an implement after the implement is secured to the robot.

As shown in FIGS. 1-7 and flowchart 8, the present invention is a mating system for use with a ground utility robot 1 that automatically couples and decouples an implement 7, accessory or attachment to and from the ground utility robot 1 using a mating interface. One of the unique aspects of the present invention is that the robot 1 can operate in an unstructured, outdoor environments using one or multiple fused sensors. A fused sensor is basically a sensor but as a fused sensor the sensor's input is used in conjunction with other sensors to paint a cohesive picture, or map, of a sensed environment, in this case, the implement and the surroundings around the implement. The robot can then use this map created by the multiple fused inputs to navigate. The robot uses the inputs to understand its surroundings. The current technology, on the other hand, allows for attachment to and from a robot only when the robot is located in a structured or fixed position, such as in a factory or assembly line. This is entirely different from the present invention where the entire system operates in an open, unstructured environment.

In the present invention the robot 1 locates and attaches to external implements 7 in an open field, a yard, a barn or anywhere the robot 1 is required to perform a task. In this open environment the robot is instructed or requested by a user or operator or by preprogrammed command. The robot obtains an idea of the location of the implement by polling historical data. That is, remembering where it left the implement the last time it was used, or by referencing user input. The robot then navigates to the implement using GPS location data. The robot uses camera input and computer vision techniques to initially locate the implement. Once located and after instruction to engage with the implement, the robot will approach the implement 7. The robot can either connect using collected and stored information or it can detect a special identification tag 10 placed on the implement at a specific location or on a specific spot relative to the implement's coupling interface. This is ideally near the coupling location. If the identification tag 10 is used then the robot will locate the identification tag 10 and will then line itself up to the implement 7 for attachment or coupling. Attachment is done using the following steps. The robot first lowers quick hitch hooks below the level of the implement's quick hitch connectors; it positions itself using stored data and/or the identification tag 10; then raises the quick hitch to capture the implement via connecting points. After attachment the robot 1 can then perform its assigned task, such as plowing, mowing, planting, or any other task, utilizing the implement 7. When the work is complete the robot 1 can detach from the implement 7 and leaves the implement in a defined location.

In general, this invention is a system to automatically connect and disconnect the implement, using a three point hitch, to the ground utility robot. Specifically, this is an automatic implement attachment and detachment system made up of a ground utility robot 1 having at least one sensor 2, a computer processor 12, and computer memory 13; a quick hitch attachment apparatus 3 having a body 4 securable to the ground utility robot 1, and at least one mateable connection part 5, where all of these connecting parts are mateable to an implement 7 where the implement 7 has at least an implement body 8, at least one connection member 9 that is mateably connectable to the at least one quick hitch apparatus connection part and where the implement attachment system is configured to automatically attach and detach the implement 7 to and from the ground utility robot 1. In this particular embodiment it is further envisioned there is a locking device 6 that can lock the at least one connection part 5 to the at least once connection member 9 after they are mateably connected. The locking device 6 can be manually operated or mechanically operated, but ideally this locking device 6 is an electronically actuated locking mechanism. In one embodiment this locking device 6 is located at two points and automatically locks the at least one connection member 9 to the at least one connection part 5 once joined.

Figure 5:
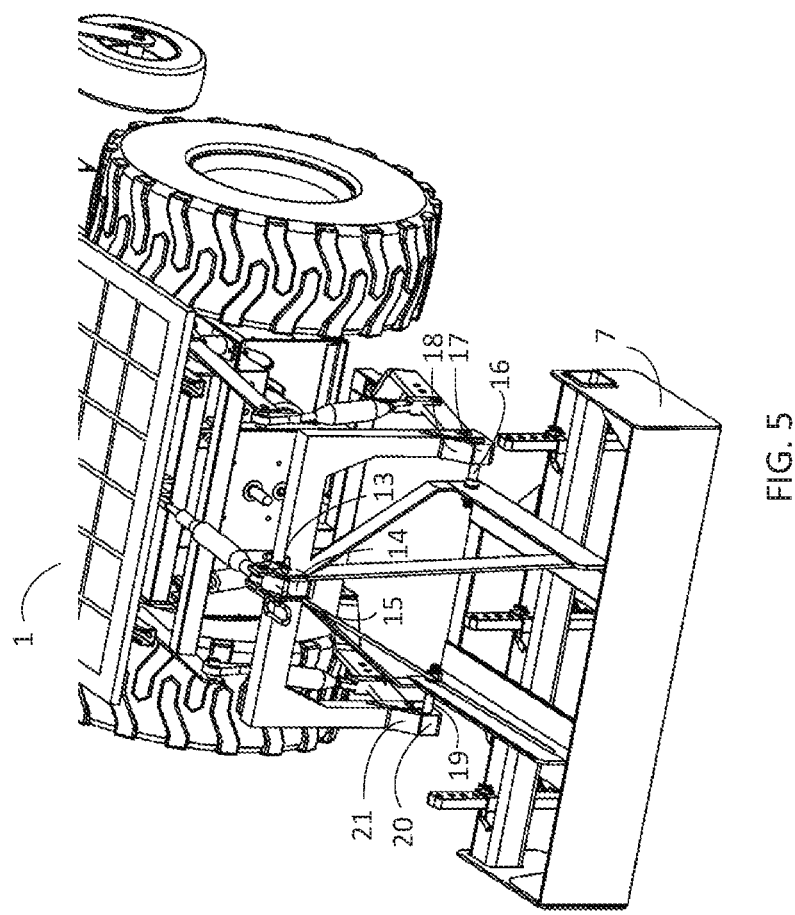
FIG. 5 is rear perspective view of the ground utility robot and an implement after the implement is secured to the robot.
Figure 6:
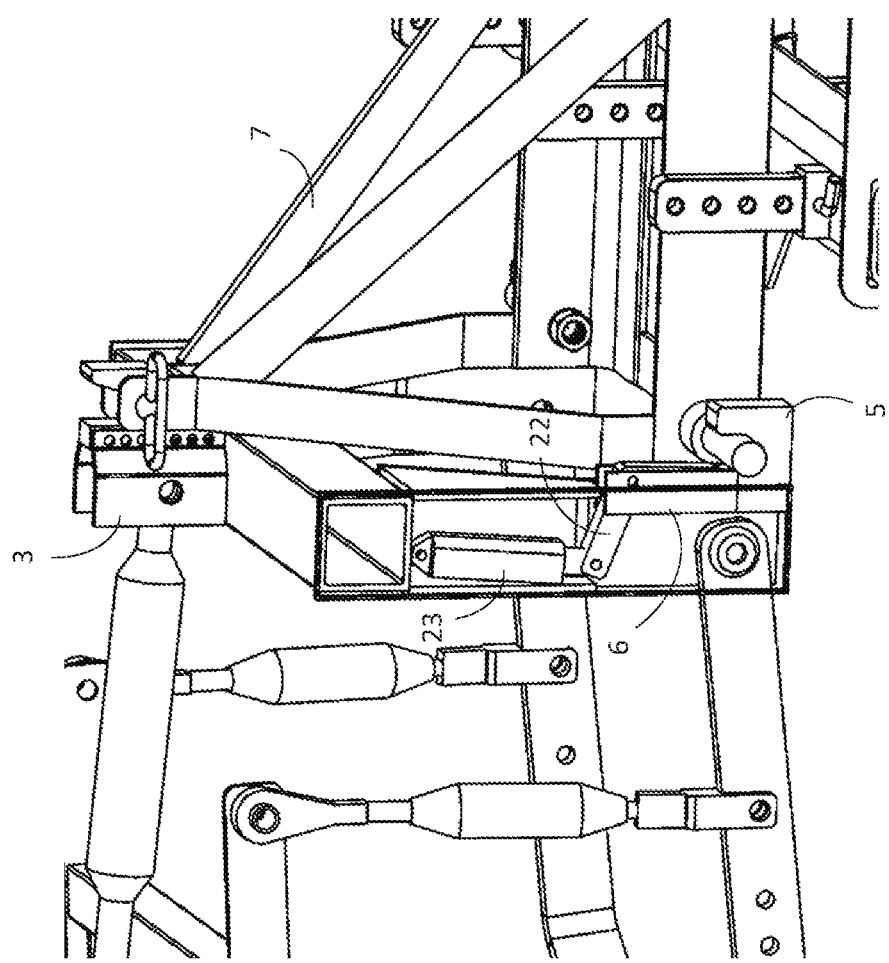
FIG. 6 is a close up of the electronically actuated locks when open.

In one embodiment based on the above, the quick hitch attachment apparatus 3 has three connection points that are matingly connectable to a 3-point attachment apparatus 8 on the implement 7. This is commonly known as a 3-point hitch. In this configuration there is a first connection point 13 having a first connection part 14 located at a top of the quick hitch attachment apparatus body 4 that is connectable to a mating first connection member 15 located at a top of the implement 7. In one configuration this connection point does not lock, but in a different configuration can be lockable if desired. Rather, it is generally a type of hooking attachment where the first connection part 14 located on the quick hitch attachment apparatus is a hook and the first connection member 15 is a pin or some other element that is received by or captured by the connection part 14 hook. Next, there is a second connection point 16 having a second connection part 17 located at a first lower side of the quick hitch body 4 and that is connectable to a mating second connection member 18 located at a lower first side of the implement 7. Finally there is a third connection point 19 having a third connection part 20 located at a second lower side of the quick hitch body 4 and that is connectable to a mating third connection member 21 located at a lower second side of the implement 7. In typical operation, the second and third connection parts 17, 20 are hooks that are located on either side of the 3-point hitch quick hitch body 4 and the second and third connection members 18, 21 are pins that are located on either side of the implement 7 that are received by and then secured to or within the second and third connection parts 17, 20 of the three point hitch body, as shown in FIGS. 5 and 6.

As mentioned above, in common terms this is typically called a three-point hitch. In order to secure the quick hitch attachment apparatus 3 to the mating parts of the 3-point implement attachment apparatus all of the connection parts need to connect to the attachment members. Also as noted above, the first connection member 15 and connection part 14 located at the top of the hitch and implement do not typically lock in place. It is usually a member that drops into a hook. The top connector typically is not locked in place but could be locked if configured to lock and this lock could also be manual or automatically activated.

However, the lower connection parts 17, 20 and connection members 18, 21 are basically the opposite configuration of parts 15, 14 where the pins are now located on the implement and are insertable to hooks on the 3-point hitch and these members should lock in place in order to prevent accidental disengagement of the implement 7 from the quick hitch attachment 3. In one embodiment these locks could be manually lockable. Ideally though, as shown in FIGS. 5 and 6, the two locks are electrically actuated locking devices 6 located at each of the two lower connecting points that automatically lock and secure the implement 7 to the body 4. These electrically actuated locking devices 6 utilize an electric linear actuator 23 and a pivoting retaining member 22.

Ideally these locking devices 6 are positioned at each of the two lower connection points 16, 19 to secure the connection parts 17, 20 and connection members 18, 21 one to another and to prohibit the implement 7 from accidental disengagement from the body 4 and the robot 1. The electronically actuated locking device 6 on the quick hitch consists of the pivoted retaining member or members 22 and the electric linear actuator member or members 23 that is controlled by the robot. It could configured so that only one side has a locking system but ideally the actuators and retaining members would be located on both sides and at both lower connection points. When the electric linear actuator members 23 are retracted, the retaining members 22 are pivoted out of the way in order to allow the connection parts 17, 20 on the implement 7 to enter or exit the hooks, or connection members 18, 21 on the quick hitch. When the linear actuators are extended, the retaining members 22 are pivoted out and thus keep the implement locked and secured to the quick hitch as shown in FIGS. 5 and 6.

The system explained above ideally has at least one sensor 2. It is possible to have multiple sensors in order to assist in the engagement/disengagement operations and these sensors could be of numerous types, such as a 3D camera, an infrared camera, a heat sensor, a microphone, or any of a variety of sensors that could assist in connecting and disconnecting the implement 7. In one embodiment this sensor 2 is a camera that is used to recognize the implement 7. The camera 2 is ideally placed in clear view of the implement 7 so that it can view and collect data from the area immediately around the implement and the implement 7. Data is collected each time the robot 1 interacts with the implement 7 so that over time the robot can recognize the implement. All the data collected is recorded to the computer member 12 and the processor 11 processes the data and then learns how to better recognize the implement. Ideally the data collected can be processed and organized so that eventually the automatic implement attachment and detachment system will learn different types of implements and that over time the system will recognize the different implements and it will then use the past data to assist in engaging, attaching and detaching the different implements to and from the system.

Figure 7:
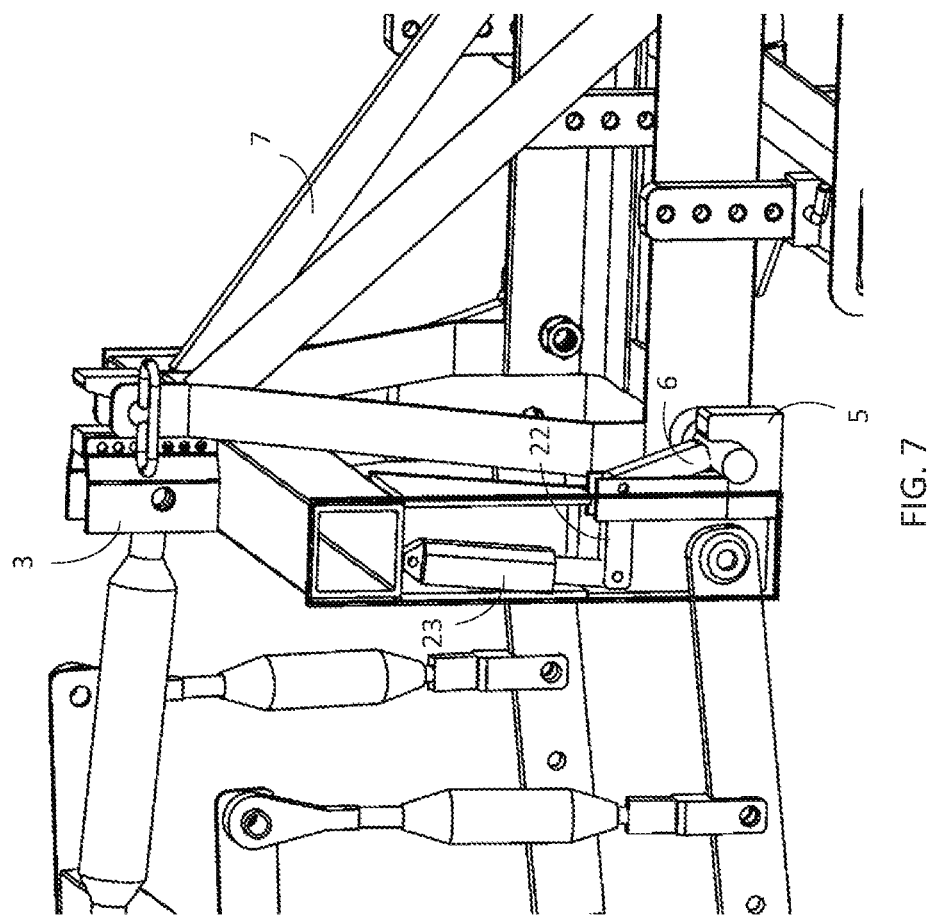
FIG. 7 is a close up of the electronically actuated locks when closed.
Figure 8:
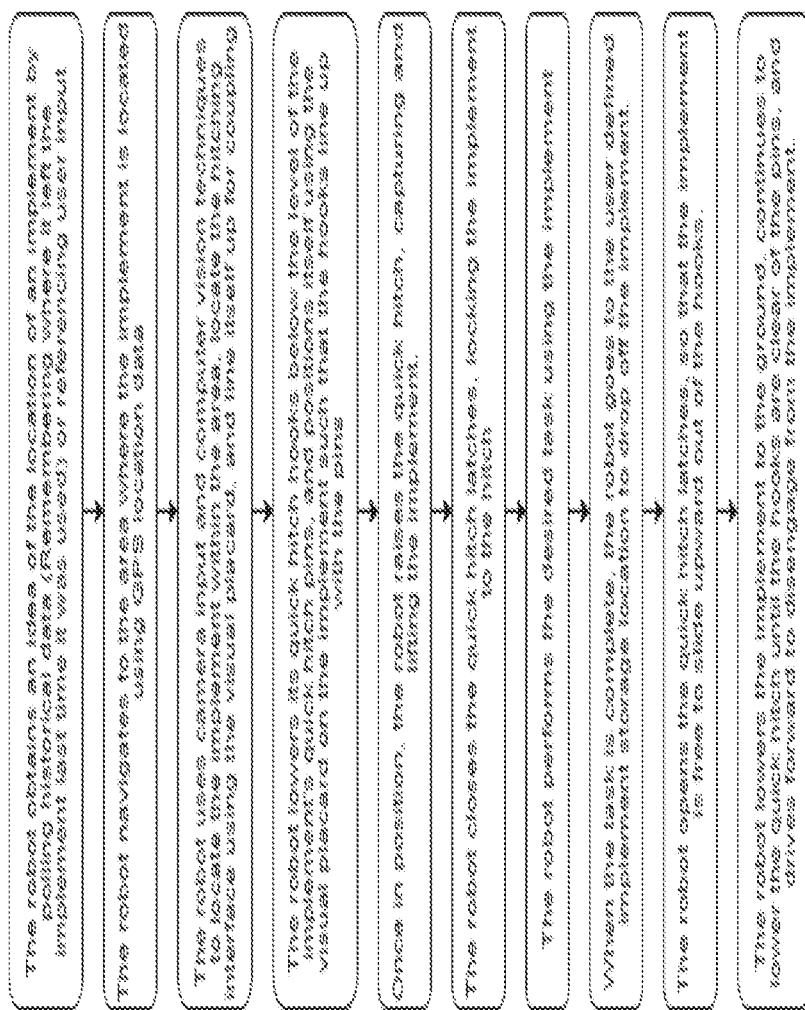
FIG. 8 is a flow chart showing how the system works.

This type of system generally requires training. Using the data collected by the camera will help the system to learn, however, in another embodiment the system also incorporates the identification tag 10, as mentioned above and as shown in FIG. 1. This identification tag 10 is affixed or secured to the implement 7 where the tag 10 is readable by the sensor/camera 2. Like any robotic system, this invention is made up of sensing, processing, and actuating elements. The identification tags 10 that are placed on the implements 7 are designed such that they are distinct to their surroundings from the perspective of the ground utility robot's 1 sensors 2, in a range of lighting conditions, and in a range of environmental factors, including precipitation, fog, snow, rain sleet, hail, and a plethora of other environmental factors. These tags are detectable and readable from multiple angles. Because of this the camera 10 placement is not limited and the camera 2 may be placed in a variety of locations on the robot 1. The identification tags 10 convey encoded implement information that assists the robot while engaging and disengaging from the implement. The identification tags 10 may also appear at different scale depending on the distance from the relevant sensor 2, such that the robot 1 can derive its distance from the tag 10. FIG. 7 shows a flow chart of typical operation of the system.

In the embodiment utilizing the identification tag 10, the tag is encoded with implement specific information that is received and captured by the camera 2 whereby the camera reads the data and then transmits the data to the processor 11 and the memory 12 to enable automatic attachment and detachment of the implement 7 to and from the ground utility robot 1. After the information is received the processor 11 utilizes the identification tag information and continually combines this pre-existing, formatted data with newly acquired data that is continually compiled and uploaded to the memory 12 each time the utility robot 1 attaches and de-attaches from the implement 7 so that the memory 12 eventually has enough data to enable attachment and detachment of the implement 7 without using the identification tag 10. This learning works for every implement and eventually all implements or attachments will be connectable and disengageable without the additional data tag data or user supplied data. When this learning is accomplished the system will no longer require the data tag and it can eventually be removed from the implement.

The coupling or engagement procedure is described next. As mentioned above, the user typically initiates the command and then the robot 1 locates the specific implement desired for the chore, job or task requested. After locating the implement 7, using either the tag 10 or remembered data, the robot 1 lowers the quick hitch attachment apparatus 3 of the body 4 that has the three connection points. In one embodiment these connection parts of the body are hooks, as shown in FIGS. 1-6. The robot 1 lowers the quick hitch attachment apparatus 3 hooks below the level of the implement's quick hitch connection members. In this embodiment these connection members are pins, as clearly shown in FIGS. 1, 2, 5 and 6. The robot 1 then positions itself using the identification tag 10 data so that the hooks line up with the pins. Once in position the robot raises the quick hitch and lifts the implement 7, capturing the pins within the hooks and positioning the implement so that it can be secured in place. In other words, at each connection point, the connection members 15, 18, 21 are inserted and connected with mating connection parts 14, 17, 20 at each connection point 13, 16, 19 thus connecting and securing the implement to the quick hitch.

Once in proper position the robot 1 recognizes proper alignment and, if it is using the electronically actuated locking members 6 it sends a command to the linear actuators 23 to close the quick hitch latches with the pivoting retaining member 22, or in other words, it activates the electronically activated locking devices 6 to lock and secure the implement 7 to the robot 1, as shown in FIGS. 5 and 6. Once secured to the robot the robot 1 performs the assigned task using the affixed implement until completion. When complete the robot 1 goes to a user defined implement storage location to drop off the implement. At this point, the procedure is performed in reverse. The robot opens the electronically activated locking devices 6 by activating the linear actuators 23 that then move the pivoting retaining member 22 so that the pins, or connection members 15, 18 are free to slide upward out of the mating hooks, or connection parts 17, 20. The robot 1 lowers the implement to the ground and continues to lower the quick hitch until the all three hooks/connection members 15, 18, 21 clear all three pins/connection parts 14, 17, 20. Once cleared and disengaged the robot drives forward to finally disengage from the implement 7.

Furthermore, the processing elements within the robot's processor 12 contribute to detection robustness by using a variety of filtering techniques on the sensory input. The tag information discerned by the processor 12 is used to drive the actuation behavior of the robot 1 as it interfaces with and uses the implement 7. Variations in implement interfaces, usage techniques, or safety considerations can be encoded in tag data and understood by the services that govern the robot's behavior and this can continually be supplemented with new data acquired through continual operation as explained above.

As taught, the robot could have manually operated connectors and locking apparatus but ideally the robot 1 uses actuators to automate all previously manual interfacing steps. As noted above, the typical apparatus to connect a tractor to the implement is a 3-point hitch, or a quick hitch 3. In one embodiment of the present invention the quick hitch 3 utilizes the simple hook and pin system as is present in most 3-point hitch systems. The hooks as previously described are located on the body 4 that is connected to the robot 1. The hooks are engageable with the three mating pins, located on the implement 7 and previously had to be locked in place manually. In the preferred embodiment these hooks are locked in place using the electronically activated locks 6 as just described.

It should also be noted that the sensor 2 is not limited to only a camera. It could be a variety of sensors, including a camera, an infrared camera, a microphone, a thermometer, or any other type of sensor that senses distance, time, weather, terrain, field or soil conditions, or any other condition. Having a variety of sensors allows the robot to be used for a variety of other purposes aside from simply pulling an implement. For example, current weather conditions can be monitored, soil conditions can be monitored, or the robot could be used as a predator deterrent. These are just a few examples and more are provided in U.S. patent application Ser. No. 16/024,450 filed Jun. 29, 2018 entitled AUTONOMOUS MOBILE PLATFORM WITH HARVESTING SYSTEM AND PEST AND WEED SUPPRESSION SYSTEMS.

The present invention not only teaches the apparatus but the steps and method of connecting the implement 7 to the hitch 3 as described above. The method of connection is entirely different from the current technology because it is entirely automated and because it can be performed in an unstructured environment.

In summary, the system uses a software program to employ the connection between the robot 1 and the implement 7. The robot 1 utilizes the onboard processor 11 to run the software and the onboard memory 12 to store the data. The software running on the robot 1 processes the inbound sensor data to extract the tag information whereby the system then acts on this information to navigate the robot 1 and actuate its interfaces. Thus, the system enables the robot 1 to sense and interpret tags 10, navigate in unstructured environments, and actuate the hitching interface automatically. Everything in the system is performed without human intervention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

PARTS LISTING

1. GUR
2. Sensor (camera, motion sensor, infrared camera, etc.)
3. Quick Hitch attachment apparatus having:
4. Body
5. Mateable connection part
6. Electrically actuated locking device
7. Implement—having:
8. 3-point attachment apparatus
9. Connection member
10. Identification tag.
11. Processor
12. Memory
13. First connection point
14. First connection part
15. First connection member
16. Second connection point
17. Second connection part
18. Second connection member
19. Third connection point
20. Third connection part
21. Third connection member
22. Pivoting retaining member
23. Electric linear actuator

The invention claimed is:

1. An automatic implement attachment and detachment system comprising:
   a ground utility robot configured to work in an outside environment having:
      at least two fused sensors used to collect data from a sensed environment where said at least one of said two fused sensors is a camera;
      a computer processor that combines said data from said sensed environment to map said sensed environment; and
      a computer memory to store said data;
   a quick hitch attachment apparatus comprising:
      a body securable to said ground utility robot;
      at least one mateable connection part;
   an implement comprising;
      an implement body;
      at least one connection member that is mateably connectable to said at least one mateable connection part of said quick hitch attachment apparatus;
      an identification tag, embedded with implementation identification data, that is visible and readable by at least one of said at least two fused sensors;
      said implement attachment and detachment system uses said map and said identification tag to navigate said robot to automatically attach and detach said implement to and from said ground utility robot; and
      said processor utilizes and combines said identification tag implement identification data with newly acquired data from said sensed environment that is collected, compiled and uploaded to said memory each time said utility robot attaches and detaches from said implement.

2. The automatic implement attachment and detachment system of claim 1 further comprising:
   a locking device that locks said at least one connection part to said at least one connection member after mateably connecting.

3. The automatic implement attachment and detachment system of claim 2 where said at least one locking device is an electronically actuated locking mechanism.

4. The automatic implement attachment and detachment system of claim 3 having at least three connection points, comprising:
   a first connection point having a first connection part located at a top of said body, connectable to a mating first connection member located at a top of said implement;
   a second connection point having a second connection part located at a first lower side of said body, connectable to a mating second connection member located at lower first side of said implement; and
   a third connection point having a third connection part located at a second lower side of said body, connectable to a mating third connection member located at lower second side of said implement.

5. The automatic implement attachment and detachment system of claim 4 further comprising at least two locks located at each of said second connection point and said third connection point to lock and secure said implement to said ground utility robot.

6. The automatic implement attachment and detachment system of claim 5 where said at least two locks are electrically actuated locks that automatically lock and secure said implement to said ground utility robot to at least two of said three connection points and automatically unlock at said same connection points when detaching said implement from said ground utility robot.

7. An automatic implement attachment and detachment system comprising:
- a ground utility robot configured to work in an outside environment having:
  - at least two fused sensors used to collect data from a sensed environment where said at least one of said two fused sensors is a camera;
  - a computer processor that combines said sensed environment data to map said sensed environment; and
  - a computer memory to store said data;
- a quick hitch attachment apparatus comprising:
  - a body securable to said ground utility robot;
  - at least one mateable connection part;
  - at least one lockable connection point;
- an implement comprising:
  - an implement body; and
  - at least one connection member mateably connectable to said at least one connection part at said at least one connection point;
  - an identification tag, embedded with implementation identification data, that is visible and readable by at least one of said at least two fused sensors;
- said implement attachment and detachment system uses said map and said identification tag to navigate said robot to automatically attach and detach said implement to and from said ground utility robot; and
- said processor utilizes and combines said identification tag implement identification data with newly acquired data from said sensed environment that is collected, compiled and uploaded to said memory each time said utility robot attaches and detaches from said implement.

8. The automatic implement attachment and detachment system of claim 7 where:
- said memory eventually has enough combined data to enable implement attachment and detachment without said identification tag.

9. The automatic implement attachment and detachment system of claim 7 where said system learns new implements by using said identification tag and newly collected, compiled and uploaded data.

10. The automatic implement attachment and detachment system of claim 7 where said at least one lockable connection point is at least two connection points and is an electronically actuated locking apparatus.

11. A method of automatically attaching and detaching an implement to and from a ground utility robot configured to work in an outside environment, comprising the steps of:
- using at least two fused sensors affixed to said ground utility robot for sensing an environment and collecting data from said sensed environment where said at least one of said at least two fused sensors is a camera;
- said camera is receiving images and communicating said images to a computer processor;
- using said computer processor for combining said data from said sensed environment and mapping said sensed environment;
- said computer processor is collecting and compiling all data into a databank;
- storing compiled data in a computer memory;
- learning within a system; and
- eventually recognizing said implement;
- connecting a quick hitch attachment apparatus to an implement where said quick hitch attachment apparatus comprises:
  - a body securable to said ground utility robot;
  - at least one mateable connection part;
  - at least one locking device; and
- said implement comprises;
  - an implement body; and
  - at least one connection member;
- using said ground utility robot for locating said implement;
- activating and using said at least two fused sensors for sensing and recognizing said implement and combining implement data with said mapped data;
- aligning said implement with said quick hitch attachment apparatus by using said implement data and said mapped data from said sensed environment;
- engaging said implement with said quick hitch attachment apparatus by connecting said at least one connection part to said at least one connection member;
- securing said implement to said quick hitch attachment apparatus by using said at least one locking device, where
  - said implement further includes an identification tag having data about said implement, where said system is used for:
    - reading said identification tag;
    - conveying said data from said identification tag to said computer processor for processing; and
    - using said data for attaching and detaching said implement to and from said quick hitch attachment apparatus.

12. The method of claim 11 further using the following steps:
- using said identification tag data to identify a specific implement;
- combining said identification tag data with said data collected by said camera;
- creating a combined implement recognition data set; and
- utilizing said combined implement recognition data set so that said ground utility robot can automatically recognize any of a number of implements; and
- continually combining and learning new implement recognition data sets so that said system will be able to eventually recognize any implement without said identification tag.

13. The method of claim 11 where said locking device is an electronically actuated locking device that automatically locks said implement to said ground utility robot by:
- aligning said implement and engaging said implement with said quick hitch attachment apparatus by connecting said at least one connection part to said at least one connection member;
- activating an electric linear actuator;
- rotating a pivoting retaining member; and
- locking said at least one connection part to said at least one connection member.

* * * * *